March 21, 1961 W. H. LIGGETT ET AL 2,975,767
SERVO ACTUATOR
Filed Dec. 17, 1958 2 Sheets-Sheet 1

INVENTORS.
WILLIAM H. LIGGETT,
JAMES B. GUDIKUNST,
BY
Donald L. Royer
AGENT.

March 21, 1961 W. H. LIGGETT ET AL 2,975,767
SERVO ACTUATOR
Filed Dec. 17, 1958 2 Sheets-Sheet 2

INVENTORS.
WILLIAM H. LIGGETT,
JAMES B. GUDIKUNST,
BY
AGENT

United States Patent Office 2,975,767
Patented Mar. 21, 1961

2,975,767
SERVO ACTUATOR

William H. Liggett, Redondo Beach, and James B. Gudikunst, Los Angeles, Calif., assignors to Hughes Aircraft Company, Culver City, Calif., a corporation of Delaware Filed Dec. 17, 1958, Ser. No. 781,167
7 Claims. (Cl. 121—120)

This invention relates generally to a servo actuator and relates more particularly to a valve controlled, hydraulically operated rack and pinion type mechanism for providing oscillatory movement of an output shaft.

In the operation of many types of mechanisms, it is often required that oscillation of a member be provided. Such oscillation may be accomplished through use of many different types of structures such as motor driven cranks, opposing cylinders, mechanical linkage structures, magnetically operated devices and the like. In some further instances it is required that the means utilized to produce oscillatory motion be extremely efficient in operation and, in accordance with such efficiency, it is necessary that extremely low frictional characteristics be provided. In the present instance, this invention relates to a mechanism operable from a source of hydraulic fluid under pressure and utilizing a piston operated rack and pinion structure, the rack means being carried by a pair of pistons and engageable with a pinion gear carried by an output shaft member. Devices of this particular type have, in general, been known heretofore; however, due to the nature of such structures and operating characteristics thereof, prior similar structures have inherently had high frictional coefficients and were not suitable for use in instances requiring a small, compact, low weight device.

In devices such as missiles and the like, wherein remotely operated oscillatory motion is desired as, for example, in the control of radar scanning antennas, control surfaces and the like, an extreme necessity exists relative to the provision of actuating mechanism that is very small, hydraulically operated, and of high efficiency, in order to enable disposition in confined areas and to permit actual use thereof. Such structures must also be free from backlash or dwell in order that devices operated thereby may be accurately positioned.

It is therefore one important object of the present invention to provide a rack and pinion type servo actuator that is efficient in operation and reliable in use.

Another object of the invention is to provide a rack and pinion type servo actuator having features of novelty enabling low frictional characteristics in the operation thereof.

A further object of the invention is to provide a servo actuator of the rack and pinion type, hydraulically operated, wherein means are provided for supporting and guiding toothed rack structures and pistons connected thereto in such a manner as to provide cooperation between a pair of racks and a pinion gear in a manner enabling friction free interconnection of these elements.

A still further object of the invention is to provide a rack and pinion type servo actuator wherein means are provided to overcome difficulties normally encountered in connection with high production mechanisms and tolerance differences therein.

Another object of the invention is to provide a rack and pinion type servo actuator that is relatively small in size, light in weight and capable of producing a maximum of torque from a given pressure on a hydraulic fluid supply.

Other and further important objects of the invention will become apparent from the disclosures in the following detailed specification, appended claims and accompanying drawings, wherein:

With reference to the drawings, the actuator mechanism of this invention includes a unitary housing indicated generally at 10. The housing 10 is shown in association with an electrically operated fluid directing valve, indicated generally at V. This valve is shown by way of example only and forms no part of the present invention. The valve is included to complete a system for the direction of fluid under pressure to the desired components of the actuator. Various other types of fluid directing control mechanisms may be employed herewith without departing from the spirit and scope thereof.

Figure 1:
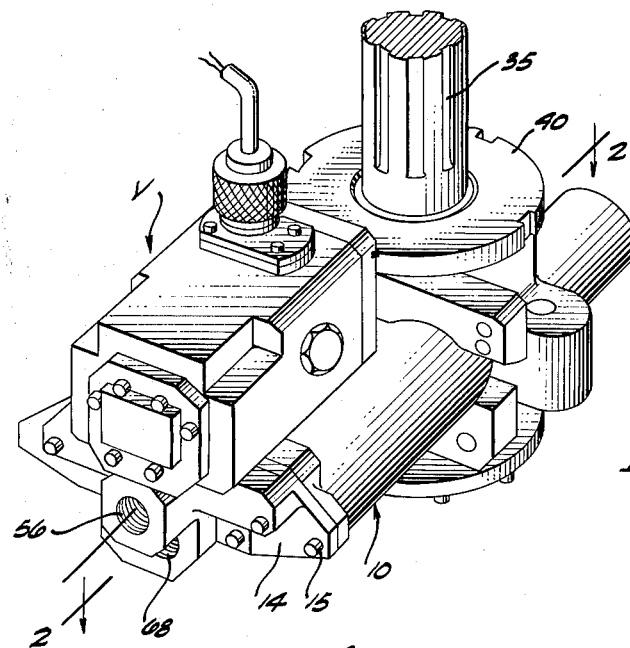
Figure 1 is a perspective view of the present rack and pinion servo actuator shown with a valve utilized for motive fluid direction.
Figure 2:
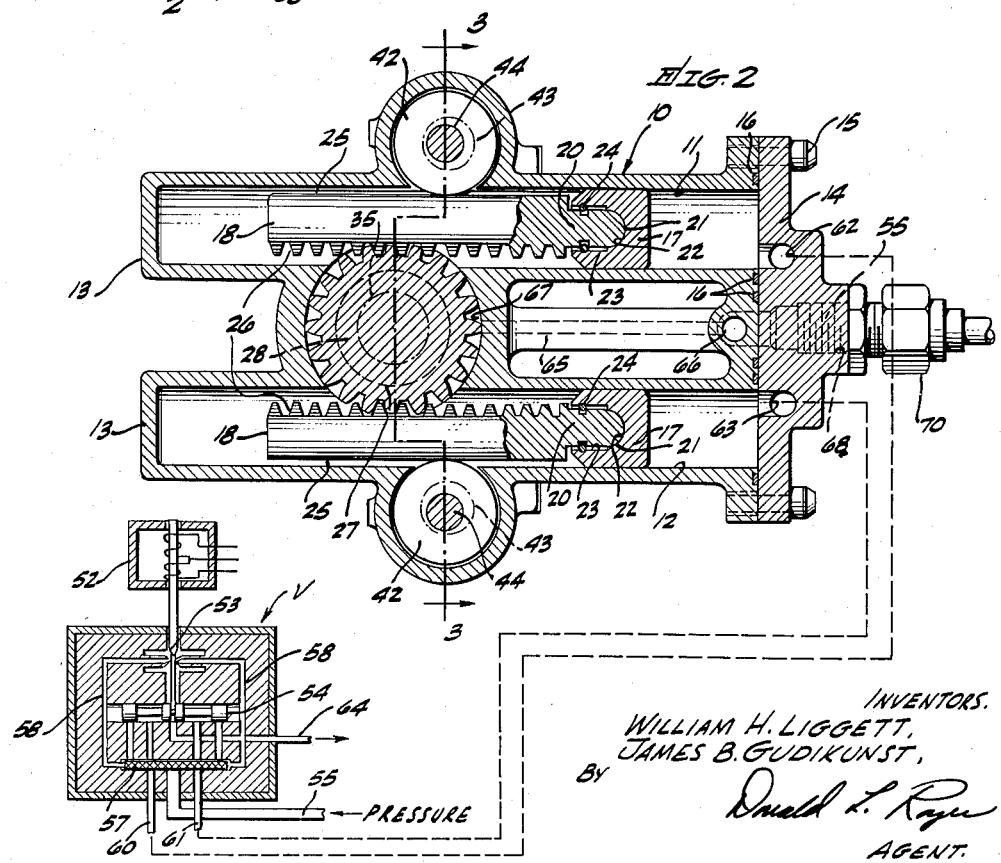
Fig. 2 is a longitudinal sectional view taken substantially as indicated by line 2—2, Fig. 1, and shown schematically in cooperation with an electrically operated fluid directing valve.

As shown primarily in Fig. 2, the housing 10 includes a pair of spaced parallel cylinders 11 and 12 formed therein. One end of each of the cylinders is integrally closed as at 13, the other end of the cylinders 11 and 12 being closed by means of an end plate member 14 that is secured to the housing 10 by means of screws 15. The plate member 14 is also sealed with respect to the body 10 by means of a plurality of seals 16.

As shown, one of a pair of pistons 17 are slidably disposed within each of the cylinders 11 and 12. The outer axial surfaces of the pistons 17 are adapted for a relatively tight sliding contact with the walls of the cylinders 11 and 12. The clearance permitted in this instance is in the order of from .00005 to .0001 of an inch. Each of the pistons 17 is connected to a rack 18 that extends within the cylinders 11 and 12. The longitudinal surfaces of the gear racks 18 are rounded for partial contact with the surfaces of the cylinders 11 and 12. One end of each of the racks 18 has an extension 20, the outermost end of which is rounded as at 21 and adapted for disposition in a spherical recess 22 in the pistons 17. It is to be noted that the radial center of the rounded end 21 is in the approximate longitudinal center of the pistons 17. The recess 22 is counter-bored as at 23 whereby to permit slight angular displacement of the piston relative to the axis of the extension portion 20. Any loading on the pistons 17 is about the end 21, thus preventing any binding on the piston. The piston head 17 is retained on the extension 20 by means of a metallic snap ring 24 that is disposed in suitable grooves in the outer surface of the extension 20 and inner wall of the counter-bore 23.

Figure 3:
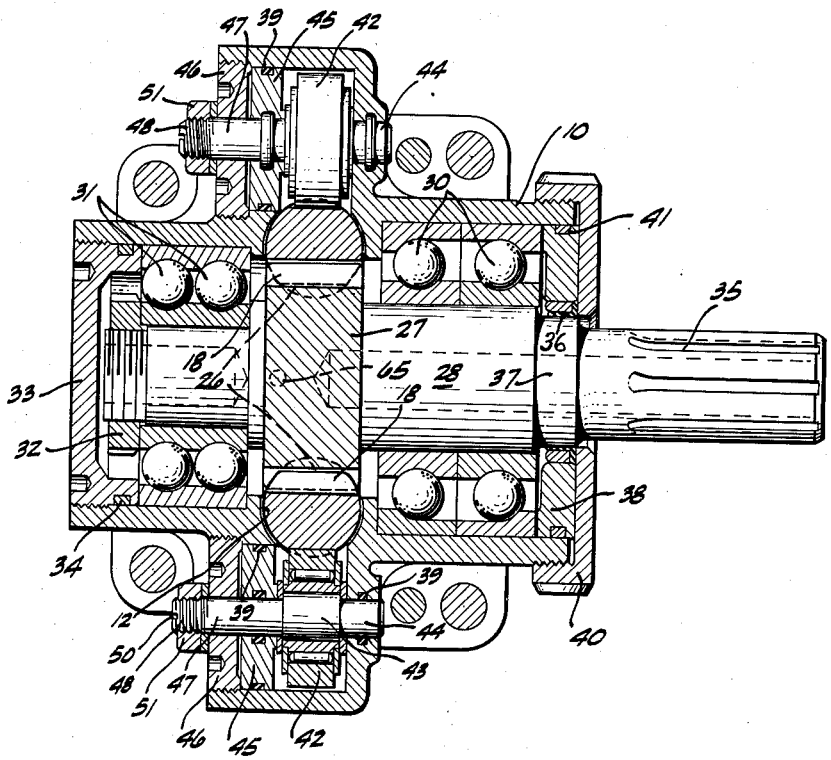
Fig. 3 is a transverse sectional view, on an enlarged scale, as taken substantially as indicated by line 3—3, Fig. 2.

The racks 18 are each provided with a planar edge 25 and a plurality of gear teeth 26 along an opposite edge thereof. The teeth 26 of the racks 18 are adapted for cooperation with gear teeth, a pinion gear 27 that is disposed between the cylinders 11 and 12 and on an axis normal to the axes of these cylinders. As shown in Fig. 3, the pinion gear 27 is carried integrally by a shaft 28, one end of which is journaled in bearings 30, the other end being journaled in a bearing 31. The bearings 30 and 31 are carried by the housing 10. The shaft 28 is retained in position by means of a nut 32 which threadably engages the end thereof adjacent the bearing 31. A closure member 33, having a seal 34, threadably engages the housing 10 to confine the end of the shaft 28 and nut 32. The shaft 28 has an extension portion 35 that may be defined as an output member to which desired structures may be attached for imparting an oscillatory torque thereto. A running seal 36 is adapted to surround a stepped portion 37 of the shaft 28 and is retained within one end of the housing 10 by means of a retainer member 38 and threaded cap 40. The retainer member 38 is sealed with respect to the housing 10 by means of a sealing member 41.

As shown in Fig. 2, the racks 28 and the surfaces 25 thereof are adapted for engagement by an outer race of a backup bearing structure 42. The bearing structure 42 is carried on an enlarged portion of shafts 43, one end 44 of each of which is secured in the housing 10, the other end thereof extending through a retainer 45 and secured in a nut 46. The nut 46 threadably engages the housing 10. An end 47 of the shaft 43 extends beyond the nut 46 and is threaded as at 48 and slotted as at 50. A lock nut 51 is adapted for engagement with the threaded portion 48 of the shaft portion 47. Suitable seals 39 are disposed about the shaft portions 44 and 47 and about the retainer 45. It is to be noted that the portion 43 of the bearing structure shaft is eccentric, whereby to permit, through use of the slot 50, adjustment of the position of the outer surface of the bearing structure relative to the surface 25 of each of the racks 18, in order that the desired engagement between the rack teeth 26 and the teeth of the pinion gear 27 may be obtained.

With reference to Fig. 2, it is further to be noted that the bearing structures 42 have axes lying in a common plane extending transversely to and normal to axes of the cylinders 11 and 12 and that this plane is parallel to and longitudinally spaced with from a second plane passing through an axis of the shaft 28 and pinion gear 27. This longitudinal displacement is established on the basis of force moments between the interengaging teeth of the racks and the pinion gear and to form a balance of forces on the pistons 17 and racks 18. Thus, the forces encountered in gear separation and forces applied against the pistons 17 are such as to minimize friction on the pistons and between the interengaging teeth. A third plane extending through the axis of one of the bearing structures 42 and the axis of the shaft 28 is substantially equal to the separation angle between the rack teeth 26 and the teeth of the pinion gear 27. In this connection it is further to be noted that any tolerance buildup during manufacture of the components of the present actuator may be compensated for by the ability of the pistons 17 to be slightly misaligned with the axes of the racks 18. This feature also permits operation of the pistons 17 within the cylinders 11 and 12 even though close tolerances are maintained therebetween and prevents malfunction or binding of the pistons within the cylinders.

As shown schematically in Fig. 2, the electrically operated fluid directing valve V includes a solenoid mechanism 52 that is adapted for operation of a valve 53 which also controls positioning of a slide valve 54. Fluid pressure is admitted to the valve V through a port 55 that communicates with a fitting 56 in the actuator body 10. The fluid under pressure extends from the port 55 through a screen 57 and thereafter through ports 58 to the valve 53. Operation of the slide valve 54 is adapted to direct fluid to one or the other of the outlet ports 60 and 61 that are connected respectively to ports 62 and 63 which communicate respectively with the cylinders 11 and 12. The slide valve 54 also serves to permit return of fluid by way of a return port 64 which may extend to a sump or suitable similar structure. By selective delivery of fluid under pressure to one of the cylinders 11 or 12, the output shaft 28 carried by the pinion gear 27 may be rotated in one direction or another due to the movement of the piston 17 and interaction between the racks 18 and the pinion gear 27.

It is contemplated that a slight amount of the fluid supplied for the operation of the present actuator will escape about the pistons 17, this fluid being used not only to lubricate the piston 17 but also the bearing structures 42 and bearings 30 and 31. Thus, the entire area surrounding the racks 18, pinion gear 25 and the bearings is filled with lubricating fluid that is returned to the system by means of a passageway 65 and port 66. The passageway 65 communicates between an annular recess 67 in the housing 10 and surrounding the pinion gear 27, and the port 66, with the port 66 extending to the fluid directing valve V and communicating with the return port 64. The port 64 is shown schematically and is actually the port 68 in the valve body 10 and is connected to a fitting 70 in a customary manner.

It may thus be seen that the construction of the present servo actuator is such as to provide efficient operation with only minimum frictional loss due to the interaction between moving and engaging components thereof. The construction is also such as to enable precise alignment and adjustment of the components relative to each other and to permit slight misalignment without detrimental effect on the operation of the actuator. It is to be recognized that a perfect condition is, from a practical standpoint, impossible to obtain under manufacturing conditions, and that precise operation of the present actuator and low frictional losses are accomplished by the adjustment, support and arrangement of and for the components as described hereinbefore. Additionally, a minimum amount of backlash or free travel is encountered in the present actuator, due to the particular construction thereof and arrangement of components therein.

Having thus described the invention and the present embodiment thereof, it is desired to emphasize the fact that many modifications may be resorted to in a manner limited only by a just interpretation of the following claims.

We claim:

1. In a servo actuating device: a housing; a pair of cylinders disposed in parallel relationship in said housing; a gear rack disposed in and partially contacting the surfaces of each of said cylinders; a piston carried by each of said gear racks and adapted for sliding cooperation with each of said cylinders; a pinion gear rotatably carried by said housing and disposed for cooperation with said gear racks; a torque output shaft carried by said pinion gear and disposed outwardly from said housing; rotatable positive backup means carried by said housing and engageable with a longitudinal edge of said gear racks for adjustably positioning said gear racks relative to said pinion gear; and passage means in said housing for conducting said fluid from between said pistons and said cylinders over said rack and pinion gear and from said housing.

2. In a servo actuating device: a housing; a pair of cylinders disposed in parallel relationship in said housing; a gear rack disposed in and partially contacting the surfaces of each of said cylinders; a piston pivotally carried by a longitudinal end of each of said gear racks and adapted for sliding cooperation with each of said cylinders; a pinion gear rotatably carried by said housing and disposed for cooperation with said gear racks; a torque output shaft carried by said pinion gear and disposed outwardly from said housing; rotatable backup means carried by said housing and engageable with a longitudinal edge of said gear racks for adjustably positioning said gear racks relative to said pinion gear; means for delivering fluid under pressure to said cylinders for action upon said pistons whereby to move said gear racks, pinion gear and output shaft; and passage means in said housing for conducting said fluid from between said pistons and said cylinders over said rack and pinion gear and from said housing.

3. In a servo actuating device, the combination of: a housing; a pair of cylinders disposed in parallel relationship in said housing; a gear rack disposed in each of said cylinders; a piston carried by each of said gear racks and adapted for sliding cooperation with each of said cylinders; a pinion gear rotatably carried by said housing and disposed for cooperation with said gear racks; a torque output shaft carried by said pinion gear and disposed outwardly from said housing; a pair of rotary backup structures for respectively positioning each of said gear racks relative to said pinion gear, said structures having axes lying in a common plane, said plane being disposed longitudinally from a plane extending through an axis of said pinion gear, said planes being normal to axes of said cylinders; and means for delivering fluid under pressure to said cylinders for action on said pistons and movement of said gear racks, pinion gear and output shaft.

4. In a servo actuating device, the combination of: a housing; a pair of cylinders disposed in parallel relationship in said housing; a gear rack disposed longitudinally in and in partial contact with each of said cylinders; a piston pivotally carried by each of said gear racks and adapted for sliding cooperation with each of said cylinders; a pinion gear rotatably carried by said housing and disposed for cooperation with said gear racks; a torque output shaft carried by said pinion gear and disposed outwardly from said housing; a pair of rotary backup structures for respectively positioning each of said gear racks relative to said pinion gear, said structures having axes lying in a common plane, said plane being disposed longitudinally from a plane extending through an axis of said pinion gear, said planes being parallel and normal to axes of said cylinders; and means for delivering fluid under pressure to said cylinders for action on said pistons and movement of said gear racks, pinion gear and output shaft.

5. In a servo actuating device, the combination of: a housing; a pair of cylinders disposed in parallel relationship in said housing; a gear rack disposed longitudinally in and in partial contact with each of said cylinders; a piston pivotally carried by each of said gear racks and adapted for sliding cooperation with each of said cylinders; a pinion gear rotatably carried by said housing and disposed for cooperation with said gear racks; a torque output shaft carried by said pinion gear and disposed outwardly from said housing; a pair of rotary positive backup structures carried by said housing and engageable with a longitudinal edge of said gear racks for respectively positioning each of said gear racks relative to said pinion gear, said structures having axes lying in a common first plane, said first plane being disposed longitudinally from a second plane extending through an axis of said pinion gear, said first and second planes being parallel and normal to axes of said cylinders; and means for delivering fluid under pressure to said cylinders for action on said pistons and movement of said gear racks, pinion gear and output shaft.

6. In a servo actuating device, the combination of: a housing; a pair of cylinders disposed in parallel relationship in said housing; a gear rack disposed longitudinally in and in partial contact with each of said cylinders; a piston carried by a longitudinal end of each of said gear racks and adapted for sliding cooperation with each of said cylinders; a pinion gear rotatably carried by said housing and disposed for cooperation with said gear racks; a torque output shaft carried by said pinion gear and disposed outwardly from said housing; a pair of rotary backup structures carried by said housing and engageable with a longitudinal edge of said gear racks for respectively positioning each of said gear racks relative to said pinion gear, said structures having axes lying in a common first plane, said first plane being disposed longitudinally from a second plane extending through an axis of said pinion gear, said first and second planes being parallel and normal to axes of said cylinders, a third plane extending through said axis of said pinion gear and an axis of one of said structures being parallel to a separation angle between gear teeth of said gear rack and said pinion gear; and means for delivering fluid under pressure to said cylinders for action on said pistons and movement of said gear racks, pinion gear and output shaft.

7. A servo actuating device comprising, in combination: a unitary housing; a pair of elongated cylinders disposed in spaced parallel relationship in said housing; a gear rack disposed longitudinally in and in partial circumferential contact with each of said cylinders; a piston pivotally carried by a longitudinal end of each of said gear racks and adapted for sliding cooperation with each of said cylinders; a pinion gear rotatably carried by said housing and disposed for cooperation with said gear racks; a torque output shaft integrally carried by said pinion gear and disposed outwardly from said housing; a pair of rotary backup bearing structures carried by said housing and engageable with a longitudinal edge of said gear racks for respectively positioning each of said gear racks relative to said pinion gear, said bearing structures having axes lying in a common first plane, said first plane being disposed longitudinally from a second plane extending through an axis of said pinion gear, said first and second planes being parallel and normal to axes of said cylinders, a third plane extending through said axis of said pinion gear and an axis of one of said bearing structures being parallel to a separation angle between gear teeth of said gear rack and said pinion gear; means for delivering fluid under pressure to said cylinders for action on said pistons and movement of said gear racks, pinion gear and output shaft; and passage means in said housing for conducting said fluid from between said pistons and said cylinders, over said rack and pinion gear and from said housing.

References Cited in the file of this patent

UNITED STATES PATENTS

| | | |
|---|---|---|
| 2,168,215 | Keitel | Aug. 1, 1939 |
| 2,467,066 | Wilson | Apr. 12, 1949 |
| 2,844,127 | Steiner | July 22, 1958 |

FOREIGN PATENTS

| | | |
|---|---|---|
| 776,052 | Great Britain | June 5, 1957 |